July 29, 1952 B. TREVOR 2,605,360

TIME DIVISION MULTIPLEX SYSTEM UTILIZING A STEP-WAVE GENERATOR IN THE DISTRIBUTOR CIRCUIT

Filed March 10, 1947 10 Sheets-Sheet 1

INVENTOR
BERTRAM TREVOR
BY Harry Tunick
ATTORNEY

INVENTOR
BERTRAM TREVOR
BY Harry Tanick
ATTORNEY

July 29, 1952 B. TREVOR 2,605,360

TIME DIVISION MULTIPLEX SYSTEM UTILIZING A STEP-WAVE GENERATOR IN THE DISTRIBUTOR CIRCUIT

Filed March 10, 1947 10 Sheets-Sheet 3

INVENTOR
BERTRAM TREVOR
BY Harry Tunick
ATTORNEY

July 29, 1952 B. TREVOR 2,605,360

TIME DIVISION MULTIPLEX SYSTEM UTILIZING A STEP-WAVE GENERATOR IN THE DISTRIBUTOR CIRCUIT

Filed March 10, 1947 10 Sheets-Sheet 4

INVENTOR
BERTRAM TREVOR
BY Harry Tanick
ATTORNEY

INVENTOR
BERTRAM TREVOR
BY Harry Tunick
ATTORNEY

INVENTOR
BERTRAM TREVOR
BY Harry Tunick
ATTORNEY

INVENTOR
BERTRAM TREVOR
BY Harry Tunick
ATTORNEY

INVENTOR
BERTRAM TREVOR
BY Harry Tunick
ATTORNEY

INVENTOR
BERTRAM TREVOR
BY Harry Tunick
ATTORNEY

July 29, 1952 B. TREVOR 2,605,360

TIME DIVISION MULTIPLEX SYSTEM UTILIZING A STEP-WAVE GENERATOR IN THE DISTRIBUTOR CIRCUIT

Filed March 10, 1947 10 Sheets-Sheet 10

INVENTOR
BERTRAM TREVOR

BY Harry Tunick

ATTORNEY

Patented July 29, 1952

2,605,360

UNITED STATES PATENT OFFICE 2,605,360

TIME DIVISION MULTIPLEX SYSTEM UTILIZING A STEP-WAVE GENERATOR IN THE DISTRIBUTOR CIRCUIT

Bertram Trevor, Riverhead, N. Y., assignor to Radio Corporation of America, a corporation of Delaware Application March 10, 1947, Serial No. 733,697

4 Claims. (Cl. 179—15)

This invention relates to multiplex communication systems, and particularly to such systems utilizing pulses of electrical energy.

An object of the present invention is to provide in a multiplex system a plurality of differently biased channel selectors which are fed in parallel with a step voltage wave, whereby the channel selectors become effective at different steps or risers of the applied step voltage wave.

Another object of the present invention is to provide a method of and apparatus for sequentially assigning equal time intervals to a plurality of channel circuits by means of a step voltage wave generator.

A further object is to provide a means to allow a simple, easy and effective method of adjusting a plurality of channel selector circuits in a multiplex system to become sequentially effective at different non-overlapping time intervals.

An important feature of the present invention lies in the use of the step voltage wave generator in a time division multiplex system for controlling a plurality of channel circuits. Since the step voltage wave is characterized by precise timing of its risers, this inherent advantage is utilized to determine precise sequential intervals of time for the different operating periods of the separate channel circuits.

Figure 1:
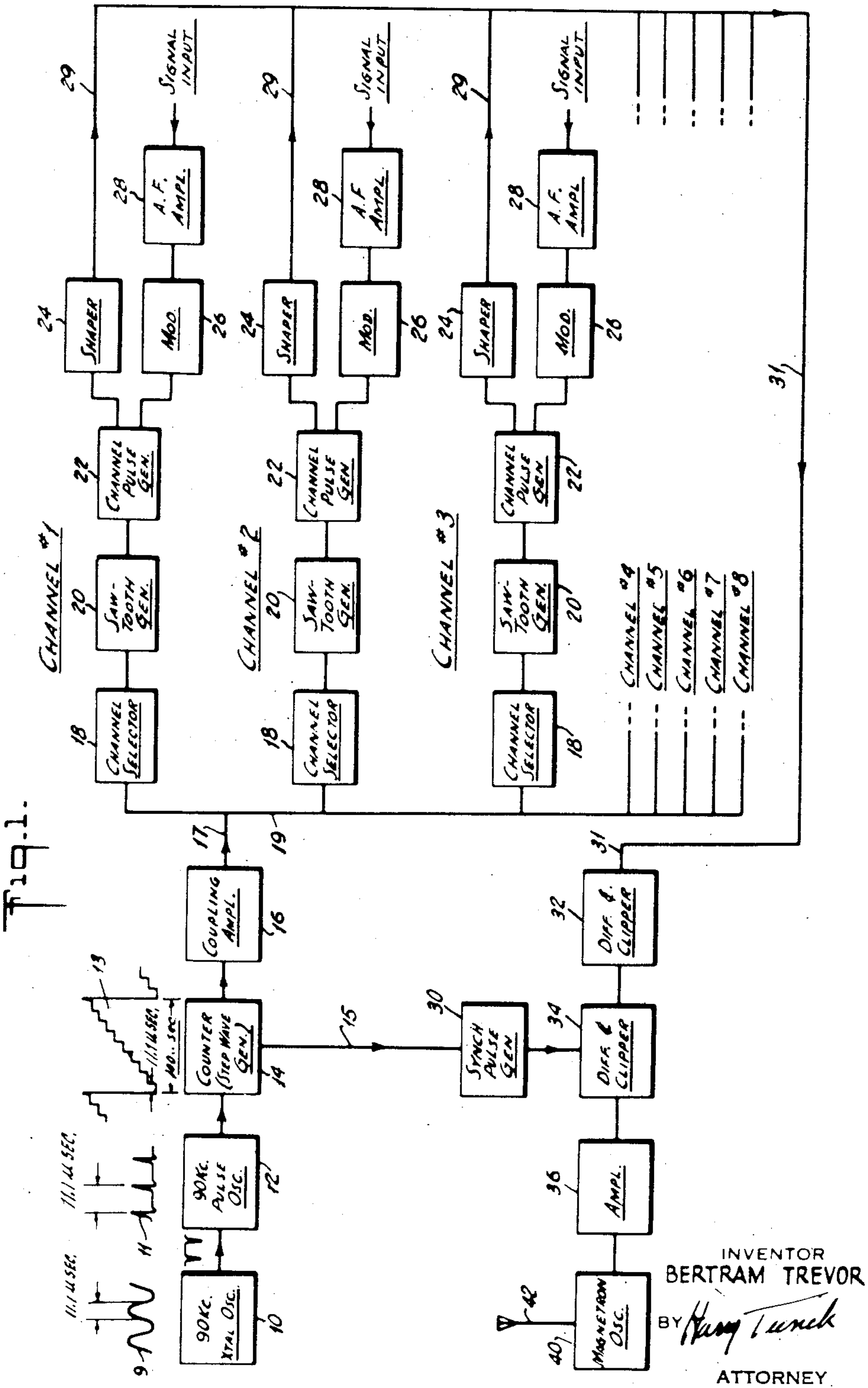
Figure 2:
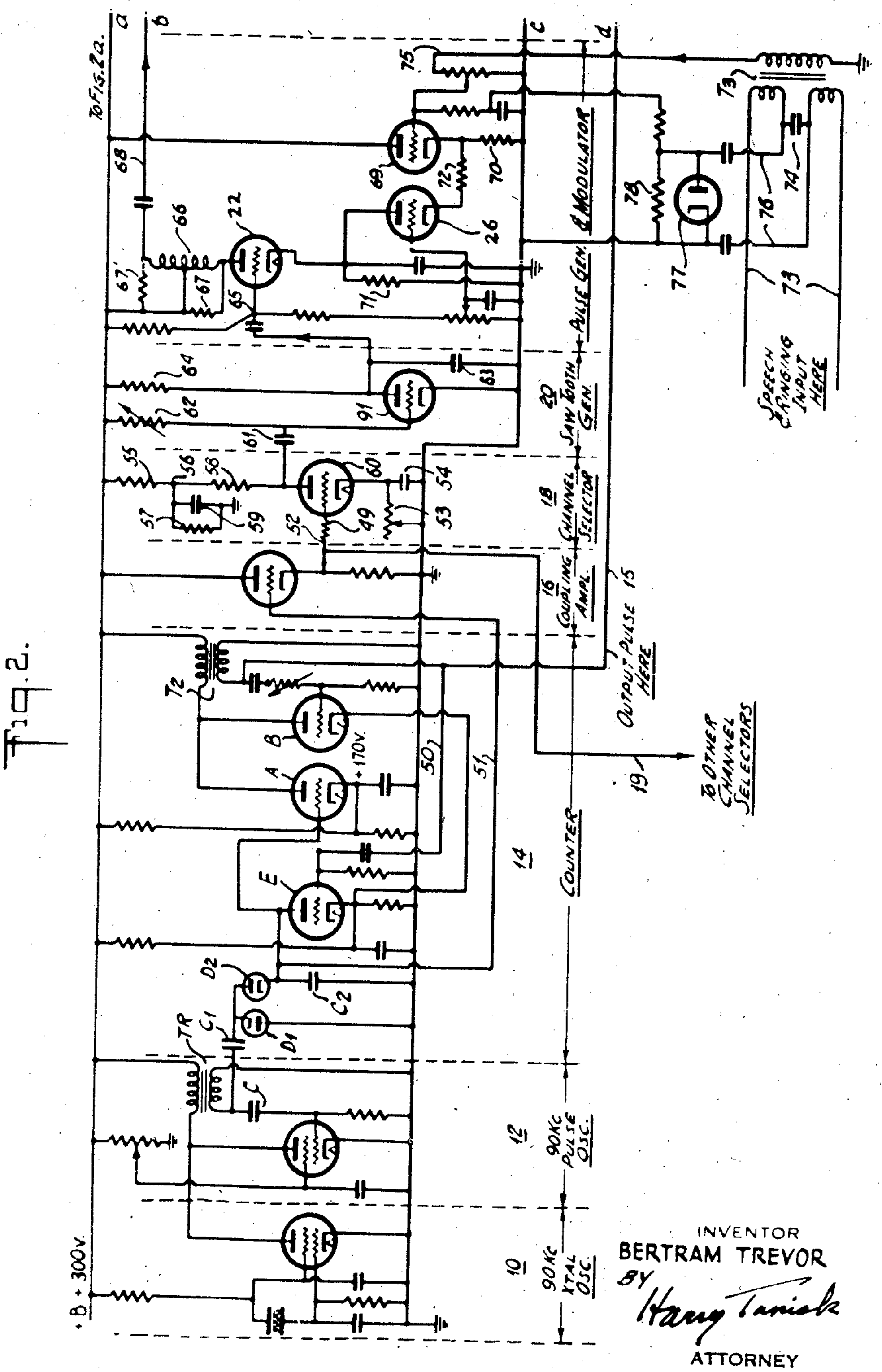
Figure 2A:
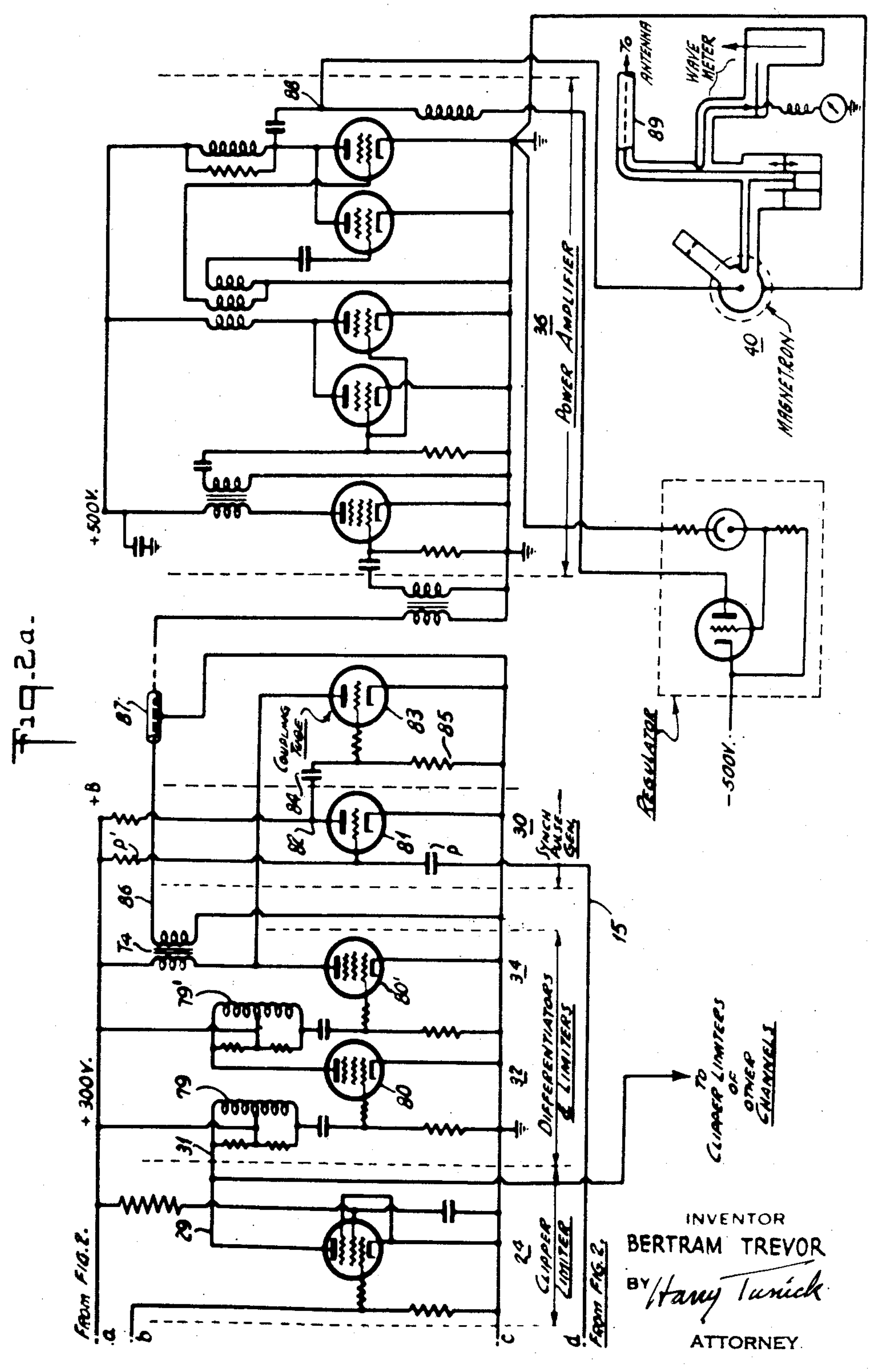
Figure 3:
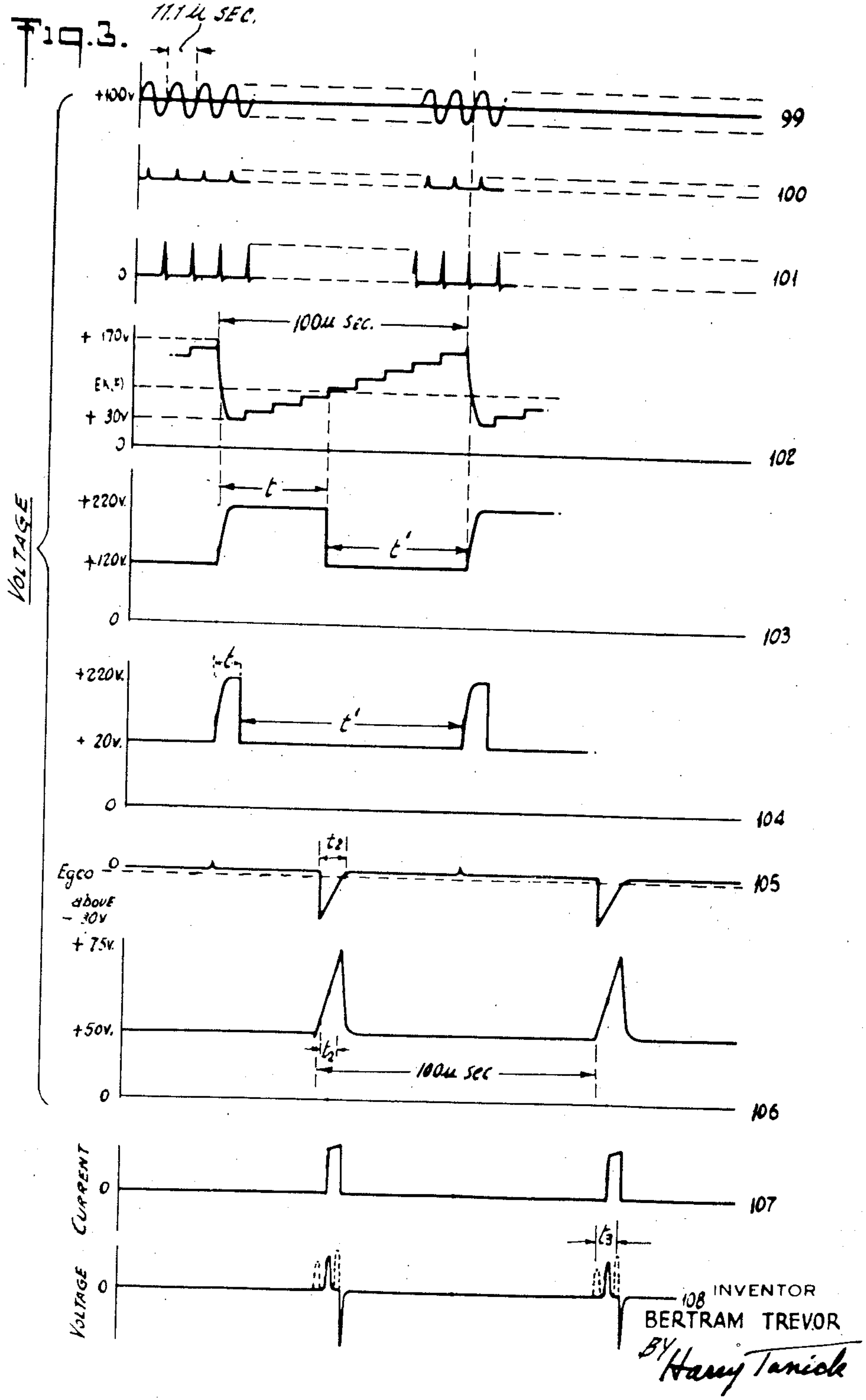
Figure 3A:
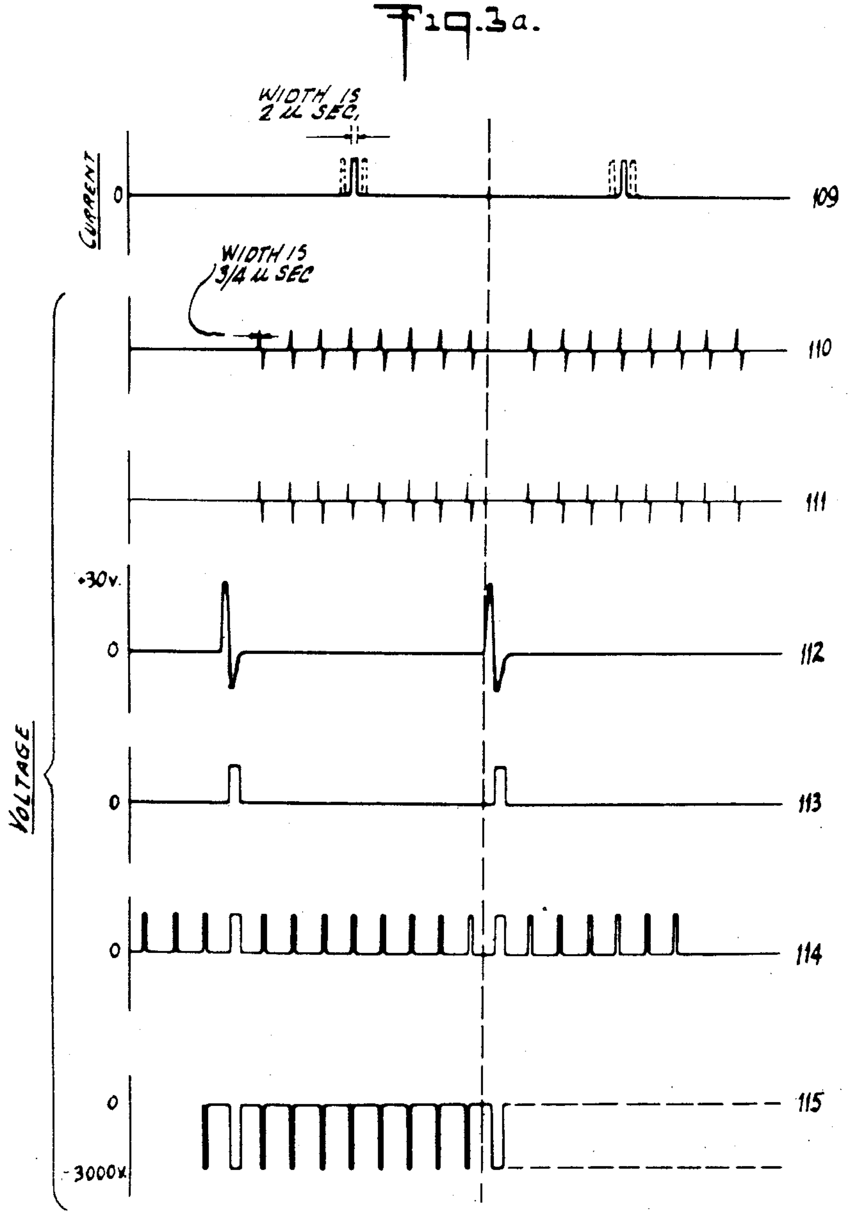
Figure 4:
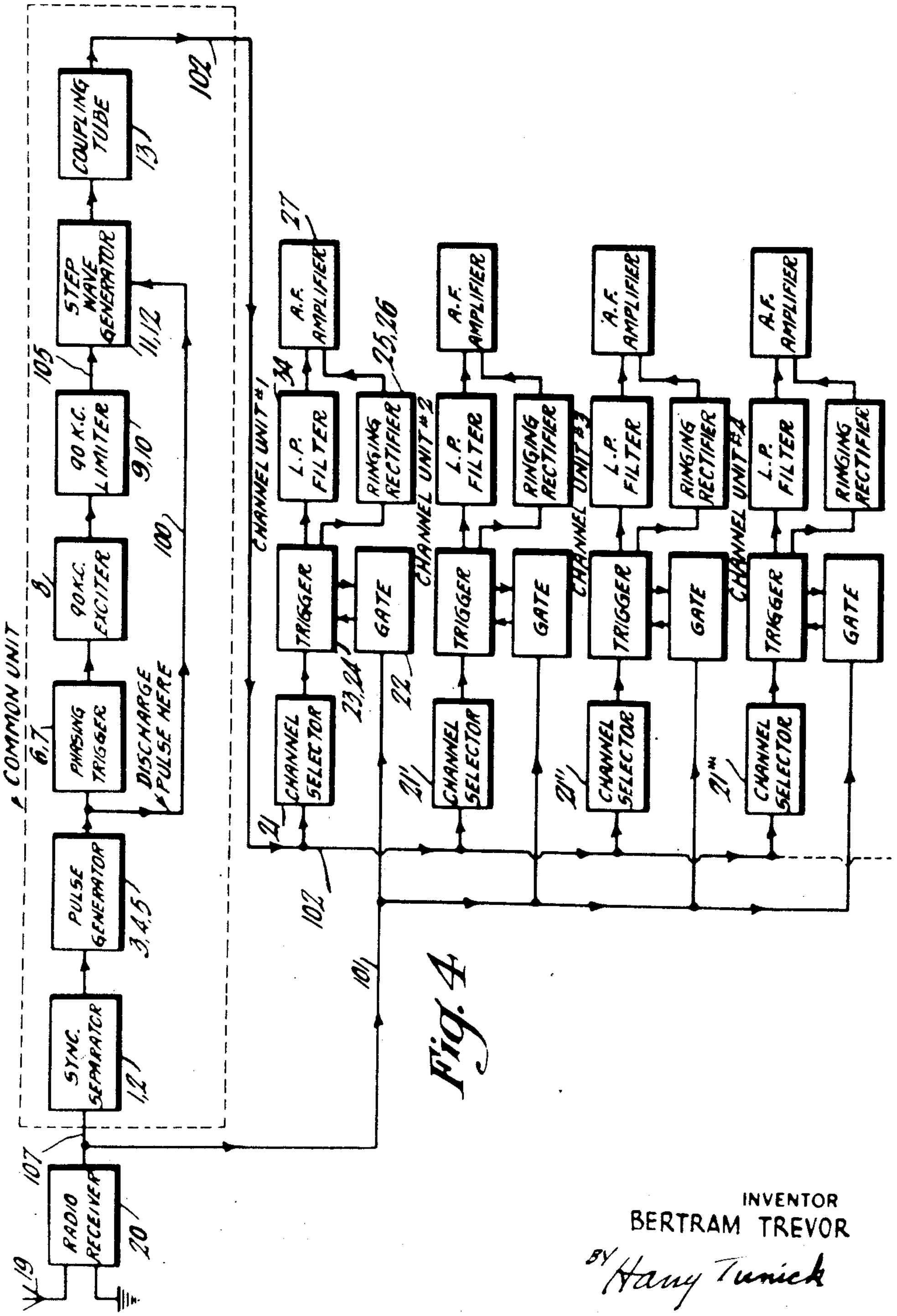
Figure 5A:
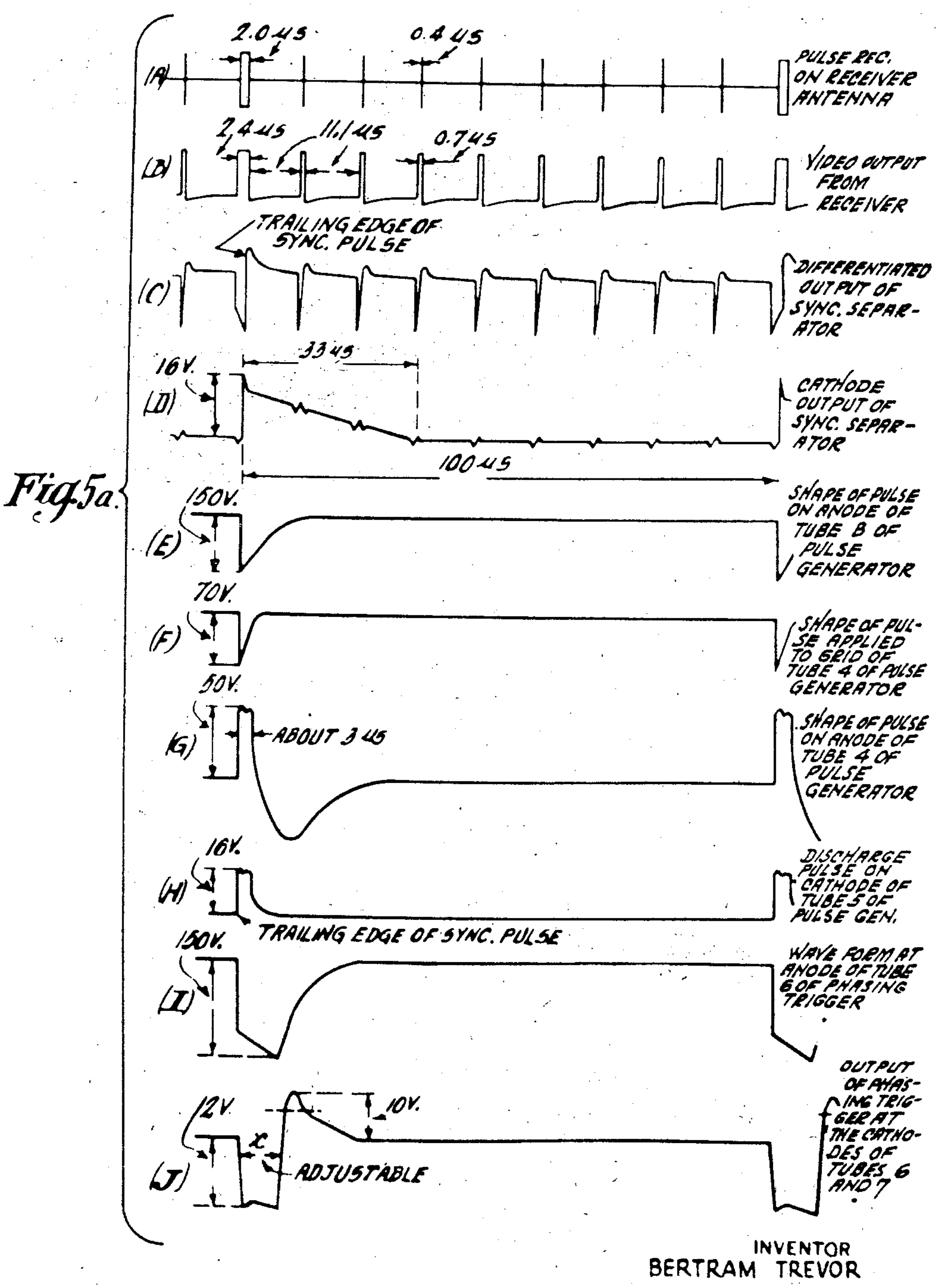
Figure 5B:
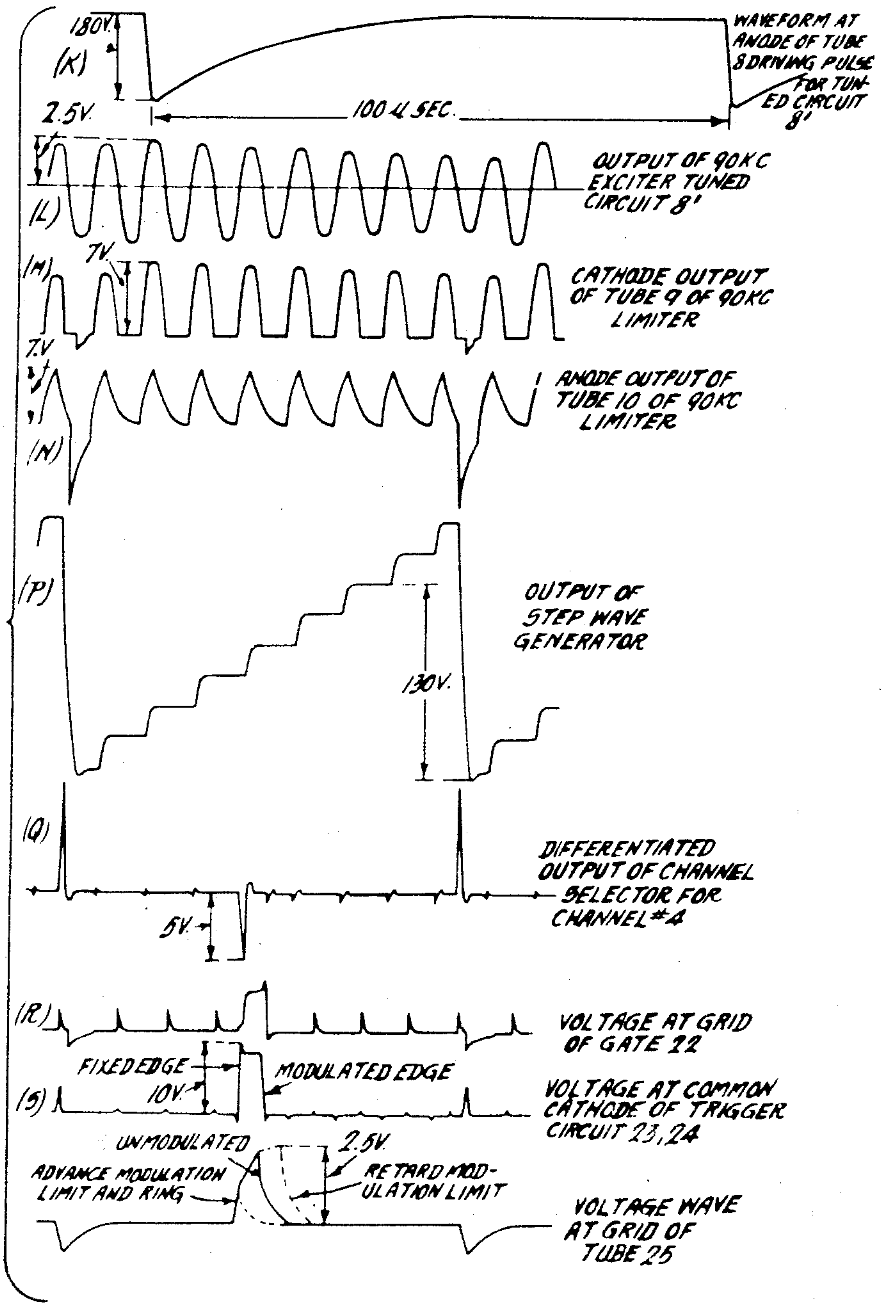
Figure 6A:
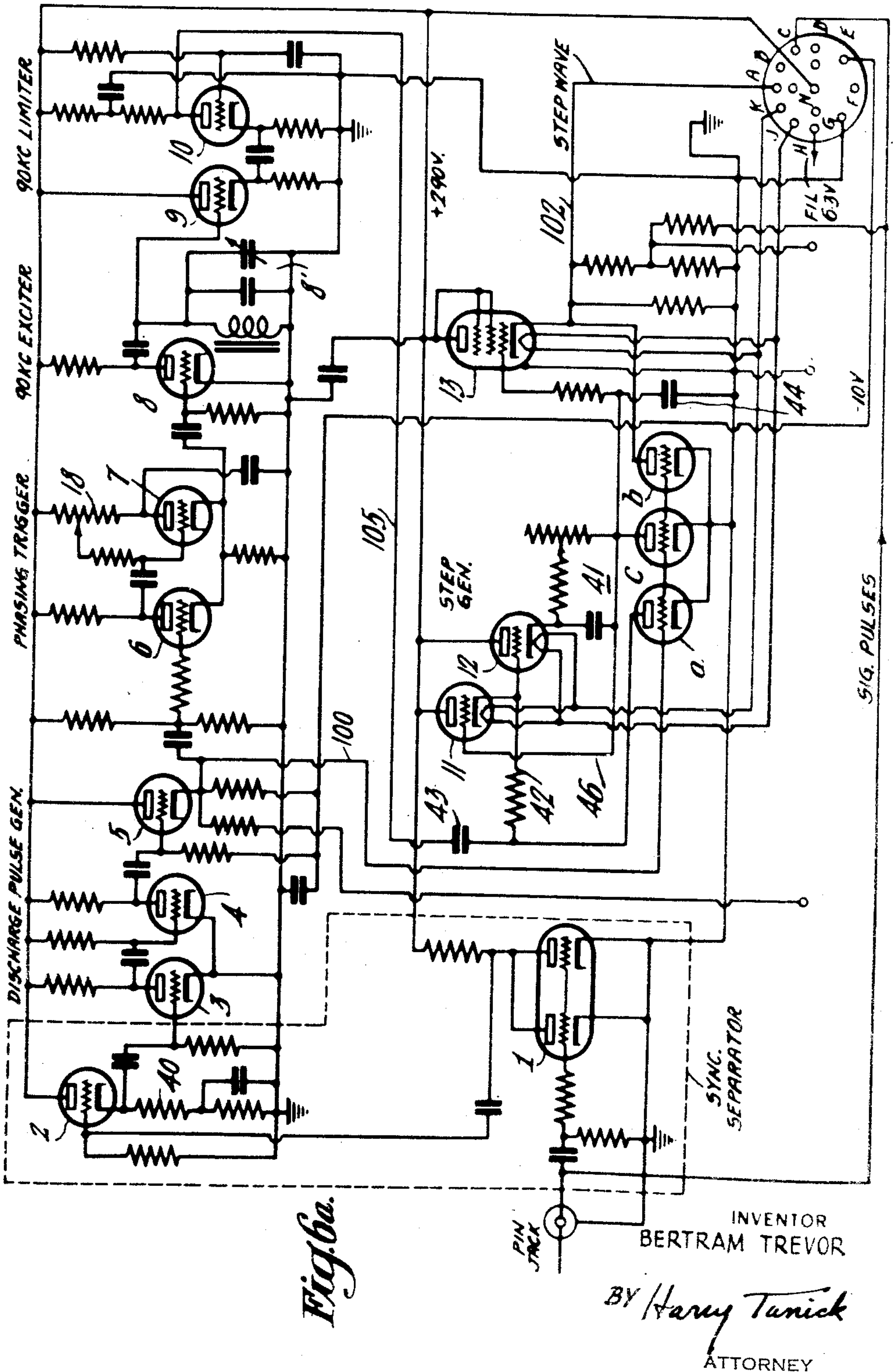
Figure 6B:
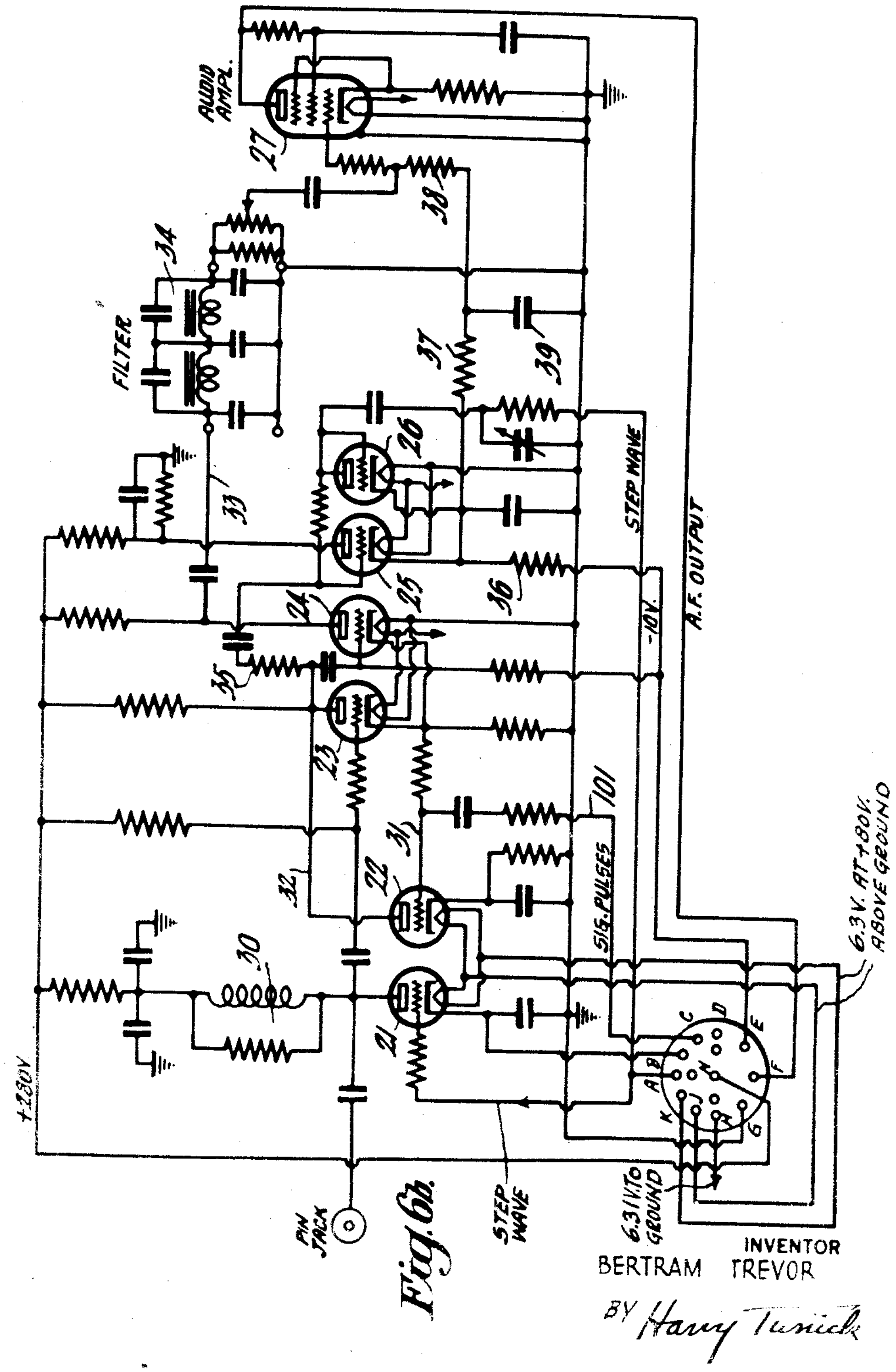

In the accompanying drawings:

Fig. 1 illustrates, in box form, the complete transmitting system for a pulse type multiplex communication system in which the invention is employed;

Figs. 2 and 2*a*, taken together, schematically illustrate the circuit details of the transmitter of Fig. 1;

Figs. 3 and 3*a*, taken together, show a series of curves graphically illustrating different voltage wave forms appearing in different parts of the transmitter;

Fig. 4 illustrates, in box form, the complete receiving system for a pulse type multiplex communication system in which the invention is employed;

Figs. 5 and 5*b*, taken together, are a series of curves graphically illustrating different voltage waveforms appearing in different parts of the receiving system;

Fig. 6*a* illustrates the circuit details of the apparatus coupled to the output of the superheterodyne receiver and shown in Fig. 4 as the "common unit;" and Fig. 6*b* illustrates the circuit details of the apparatus constituting a channel unit of which there are as many as there are channels in the system.

The transmitter of Figs. 1 and 2, 2*a* is used in an eight channel multiplex system and utilizes short pulses of radio frequency energy which are time displaced by modulation. For multiplexing purposes, the pulses corresponding to the separate channels are separately and consecutively generated at a fixed repetition rate which will be called hereinafter the synchronization rate; corresponding to a fixed time interval to be called the synchronization period. In this transmitting system the synchronization rate is 10 kc. and the corresponding period 100 $\mu$ sec. (microseconds). A pluse occurs once each synchronization period for each channel. The individual rates and periods are consequently the same and equal to the synchronization rate and period. Each channel pulse occurs at a rate of 10 kc. and the separation betwen adjacent pulses in each channel for an unmodulated condition is 100 $\mu$ sec., or microseconds. Because the unmodulated signal pulses are similarly located in each channel, they are, therefore, about 11.1 microseconds apart in the common output circuit. The pulses in each channel can be modulated $\pm 4$ $\mu$ sec. (peak modulation), thus leaving a guard space between pulses from succeeding channels of about 3.1 $\mu$ sec. This guard space is necessary to reduce cross modulation defects. The pulses from other channels occur in the interval between adjacent pulses from any one channel. The synchronization pulses occupy the ninth interval of 11.1 microseconds. The output pulses from the channels are of constant length and the time between two adjacent pulses is measured from the leading edges.

In Fig. 1 there is shown a 90 kc. crystal oscillator producing pulses of current which feed into and lock by injection a 90 kc. short pulse oscillator 12. The short output pulses from the pulse oscillator 12 are applied to a counter or step-wave generator 14. The voltage wave forms from the apparatus 10, 12 and 14 are illustrated by the curves 9, 11 and 13, respectively, appearing immediately above the equipment.

The counter 14 provides two outputs, one of which is the step wave 13 which is supplied to the coupling amplifier 16 and the other of which is a synchronization pulse occurring once for each step wave cycle and which is applied via lead 15 to a synchronization pulse generator 30. The function of the step wave 13, which is applied to the coupling amplifier and then to the different channels over lead 17, is to time the mean occurrence of each channel pulse. The output of the coupling amplifier 16 is applied to a connection 19 which is common to all the channels 1 to 8, inclusive.

All channels are substantially identical, and each includes in the order named, a channel selector 18, normally nonconductive; a saw-tooth generator 20 controlled by the output of the channel selector 18; a pulse generator 22; and an output circuit including a shaper or clipper-limiter 24. The pulses produced by the channel pulse generator 22 are modulated as to time or phase by means of a modulator 26 which is supplied with suitable signals, such as speech, from an audio amplifier 28. All channels have their inputs connected together in electrically parallel relation.

The channel selectors are differentially self-biased and each channel selector is normally biased well beyond the current cut-off condition. The bias of each channel selector is so adjusted that the applied step wave from the coupling amplifier 16 causes current to flow consecutively in the different channel selectors. One channel selector conducts for each rise of voltage in the step wave 13 up to eight, which is the number of channels. Each step rise in the step wave is great enough to insure that during its occurrence the current of the correspondingly biased channel selector shall be driven rapidly from beyond the cut-off condition to a zero bias value. Once a channel selector starts to conduct, the current flow therein will continue until the end of the synchronization period, when the input voltage to the selector drops to zero at the end of the step. The outputs from all channels appearing in leads 29 flow in a common lead 31 to differentiator and clipper circuits 32 and 34 from which pulses of shorter duration are applied to a power amplifier 36 whose output controls the production of radio frequency pulses from a magnetron oscillator 40. The very short duration output pulses from magnetron 40 which may each have an effective duration of 0.3$\mu$ sec., are fed to antenna 42, from which they are radiated to a remotely located receiving terminal (not shown).

The synchronization pulse generator 30 which receives a pulse over lead 15 from the counter 14 at the end of each step wave, produces a pulse at the end of each step wave which is supplied to the differentiator and clipper 34 and also fed to the amplifier 36 and magnetron 40 together with the channel pulses. There will thus be eight consecutively appearing pulses from the eight different channels followed by a synchronization pulse for each cycle of operations. For the unmodulated condition, all of these channel pulses and the synchronization pulse will be separated from one another by a spacing equivalent to 11.1$\mu$ sec. It will thus be seen that the synchronization period of 100$\mu$ sec. is divided into nine equal intervals by the step counter or step wave generator 14, and that all of these pulses are similarly located in each one of these nine equal intervals and similarly spaced apart for the unmodulated signal condition.

In the schematic illustration of Figs. 2 and 2a, the circuits which correspond with the circuits of Fig. 1 have been given the same labeling and reference numerals. The 90 kc. crystal oscillator 10 has an electron coupled anode circuit and supplies pulses of current to control the 90 kc. pulse oscillator 12. The pulse frequency from the oscillator 12 is normally determined in the main by the time constants of R and C, in the absence of the applied synchronizing wave from the crystal oscillator. In practice, the values of R and C are so chosen that the frequency of the pulse oscillator is slightly lower than the 90 kc. crystal oscillator 10. Transformer TR is a low inductance, tightly coupled arrangement. The sharp output pulses from the 90 kc. pulse oscillator 12 are each about 1$\mu$ sec. long and have about 40 volts amplitude. These pulses are applied to the condenser C1 of the counter circuit 14. This counter circuit or step wave generator comprises a condenser C1, a pair of diodes D1 and D2 (which may be arranged within a single evacuated envelope or comprise two separate tubes as shown), a condenser C2, and normally non-conductive triode vacuum tubes A, B and E. Condenser C1 is of much smaller value than condenser C2 and in the present case (where a step wave voltage output of nine steps is desired) where condensers may for example, have a ratio of $$\frac{C1}{C2}=\frac{1}{20}$$

For the positive rising edge of a pulse from the pulse oscillator 12, diode D1 will not conduct, but D2 will conduct; and hence the circuit will appear as though the two condensers C1 and C2 are in series to ground. Hence $\frac{1}{20}$ of the total input voltage appears across condenser C2, for the foregoing assumption that C1 has a size which is $\frac{1}{20}$ that of C2. On the negative falling edge of the pulses from the pulse oscillator 12, diode D1 will conduct, but diode D2 will not conduct, leaving unchanged the voltage on C2 acquired during the immediately preceding rise of the pulse. The voltage on C1 will be completely discharged through D1 during the negative drop. During the next positive rise of the applied pulse, the condenser C1 will be recharged through D2. Each time there is a positive rise in voltage applied by the pulse oscillator to the condenser C1, there will be an incremental increase or step-up in voltage on condenser C2 of about 20 volts, although each charge on condenser C2 after the first is slightly less than the preceding one. It should be important to note at this time that there is no resistance established across condenser C2 because it is desired that there be complete absence of current or charge leakage on this condenser during the voltage step-up operation.

Vacuum tubes A and B and E are normally non-conductive; that is, they are biased to cut-off condition. Tube A has a 165 volt bias on its cathode, and hence the voltage across condenser C2 must exceed approximately +155 volts before tube A conducts. The building up of a charge on C2 on the ninth rise to about 155 volts will cause tube A to start conducting very suddenly, as a result of which a pulse of current is passed through transformer T2, which is so poled that it applied a sharp positive pulse to the grid of tube B, causing tube B to conduct suddenly and pass a sharp pulse to the grid of tube E via lead 50. Tube B, in effect, is an over-biased pulse oscillator and is connected regeneratively to produce only one pulse in response to the flow of current in tube A, after which it ceases conducting. Tube B triggers off or fires to produce a constant amplitude discharge pulse irrespective of the amplitude of the pulse from tube A, and this discharge pulse causes normally non-conducting tube E to conduct. When tube E conducts, it provides a low impedance path for the charge on condenser C2. This condenser C2 then discharges through tube E to a relatively low value. The time constants of the counter or step generator 14 are so designed that there are nine risers or incremental steps in voltage on C2 before it discharges. The counter provides two outputs, one a step wave voltage which is taken from condenser C2 and applied to lead 51, and the other a synchronizing pulse at the end of each step wave which is taken from the transformer T2 and applied to lead 15. The cycle of operation then repeats itself. The counter 14 can be arranged to provide a different number of steps by varying the ratio of the capacitance values of condensers C1 and C2, if a different number of channels are employed.

The coupling amplifier 16 is merely a cathode follower which obtains a step wave voltage input from the counter circuit over lead 51. This coupling amplifier provides an output from its cathode over lead 52 of the same polarity and voltage as the input wave taken from condenser C2, without loading condenser C2. Amplifier 16 does not draw grid current.

Output from the coupling amplifier is taken from its cathode and is applied to all of the channel selectors 18 in parallel. The apparatus in only one channel has been shown since all of the channels have substantially identical equipment and function similarly. Each channel includes a channel selector 18 and the different channel selectors are biased differently by individual cathode rheostats 53, each of whose effective values determines a certain cathode bias. Each channel selector includes a vacuum tube 60, a series grid resistor 49, an adjustable cathode bias resistor 53, a pair of resistors 55 and 58 connected in series between the anode of tube 60 and the source of anode polarizing potential B, a bleeder resistor 57, and a pair of by-pass condensers 59, 54.

The channel selectors are normally non-conductive; i. e., biased to cut-off. Channel number 1 is biased to conduct on the first rise in the applied step wave voltage, let us say at +35 volts, because the system is so arranged that condenser C2 cannot discharge below let us say 30 volts. The channel selector in channel number 2 is arranged to conduct on the second rise at another 15 volts higher then the bias on the first channel selector; or at a value of 50 volts. The succeeding channels are arranged to conduct sequentially at different rises in the step wave voltage applied to the different channel selectors 18 by the coupling amplifier 16. In the channel number three, current will flow in the associated channel selector on #3 riser in the step wave, while in channel #6 current will start to flow in its associated channel selector on #6 riser in the step wave. It will thus be seen that the step amplitude at which each channel selector conducts is determined by the cathode bias which is developed across resistor 53 and condenser 54, and that different adjustments of resistor 53 will give different cathode biases.

After each channel selector 18 which is normally non-conductive starts to conduct, further rises in the step wave will not produce any appreciable anode current increase in that channel selector because of grid current limiting due to resistor 49. Stated in other words, each channel selector is caused to carry current starting on the particular step riser which furnishes a voltage of sufficient magnitude to overcome its cut-off potential, and this channel selector will continue to pass current to the end of the step wave voltage. Let it be assumed that channel selector 18 for the first channel starts to conduct on the first rise in the step voltage at a value of 35 volts. When the second rise in the step wave voltage occurs, the first channel selector is already passing current. The increase in voltage in the step voltage wave appearing in the output of the coupling amplifier will merely cause the grid of the first channel selector to draw current, and the channel selector thus acts very much like a diode between its grid and cathode to cause anode current limiting. Hence, as each additional channel selector after the first starts to conduct (when additional rises occur in the step wave) the preceding channel selectors which are already conducting will continue conducting with substantially the same anode current as before. After the ninth rise in the step wave voltage, the amplitude of the step wave falls down to its minimum value (30 volts in this case) and all channel selectors will cease conducting. This cycle of operations will repeat itself for each new step wave voltage.

The operation of the system so far described in connection with circuits 10, 12, 14, 16 and 18 may be better understood by reference to the curves 100 through 104 of Fig. 3. Curve 99 illustrates the sine wave output of the 90 kc. crystal oscillator 10. Curve 100 illustrates the current pulses from the anode circuit of the crystal oscillator 10. Curve 101 illustrates the short sharp pulses in the output of the 90 kc. pulse oscillator 12 which are synchronized by the sine wave oscillator. Curve 102 shows the step wave voltage produced by the counter 14. It should be noted that this step wave voltage begins at about 30 volts positive which is the lowest voltage to which condenser C2 can be discharged, and rises to about 155 volts positive. The step wave voltage of curve 102 is shown as having nine steps or risers. Curve 103 shows the anode voltage of one channel selector 18, let us say in channel number 4, while curve 104 shows the anode voltage of selector 18 in channel #1. Thus, referring to curve 103, it will be seen that the anode voltage of the vacuum tube 60 of the channel selector is a maximum over a period $t$ corresponding to the non-conducting period of the channel selector, and that this anode voltage drops suddenly on the fourth rise of the step wave voltage curve 102 when the channel selector becomes conducting, and this anode voltage remains low over a period $t'$ corresponding to the conducting period of the channel selector of channel number 4. Similarly, by referring to curve 104, it will be seen that the anode voltage on the channel selector vacuum tube is a maximum over a period $t$ corresponding to the non-conducting period of the selector tube, and drops suddenly at the first rise in the step wave voltage of curve 102, at which time the channel selector in channel #1 becomes conducting. During the conducting period $t'$ of the channel selector 18 of channel #1, the anode voltage on the channel selector tube will remain low. It should be noted from curves 103 and 104 that once the channel selector in a particular channel becomes conductive it continues to be conductive to the end of the step wave of curve 102.

The channel selector 18 is so arranged that the amplitude of the output voltage pulse on the anode of its vacuum tube 60 is constant regardless of its particular channel position; or, putting it in other words, the different channel selectors furnish a constant amplitude output voltage over a wide range of cathode biases for the different channels without requiring additional adjustments when its bias is changed over this range. The operating position of any one channel selector circuit 18 relative to the different risers on the step wave voltage can be changed by a simple bias adjustment without the need for making other to compensate for the change in bias. The reason for this will now be given.

If resistor 55 in the channel selector were zero, then the voltage at point 56 would be constant (equal to +B) regardless of channel position, but the anode-to-cathode voltage of the vacuum tube 60 prior to its conducting time would decrease with increasing channel number, since the voltage at the cathode increases as the channel number is increased, as a result of which the output voltages for the different channel selectors would be different. When resistor 55 is given a finite value, then the voltage at point 56 over the entire time for one complete step wave (considering only one cycle of operations) increases in the different channels with increasing channel number, since the average current in vacuum tube 60 decreases over this same time interval. By properly choosing a value of +B and resistor 55, the anode voltage can be made constant with channel position for all channels; that is, changes of voltage at point 56 will be equal to changes in the cathode voltage as the channel position is changed, resulting in an amplitude of voltage pulse at the anode of tube 60 which is constant with channel position, since the peak anode current is a function of the anode to cathode voltage.

It should be evident that the resistors 55 in the different channels carry different average currents, due to the different conducting periods of the channel selectors. Thus different average currents produce different IR drops in the resistors 55 to compensate for different rising cathode voltages, but the voltage output from the different channel selectors are practically the same since the cathode to plate voltage remains constant. Hence, one channel can be used in another channel position without making adjustments to compensate for the different cathode biases. The same value of resistor 55 is used in all channel selectors. Except for the different adjustments in cathode biases, all of the channel circuits are identical.

A resistor 57 is employed in the channel selector to set the mean value of the voltage at point 56 in order to provide the proper operating conditions for vacuum tube 60. The use of this resistor 57 eliminates the necessity for varying the value of +B in order to obtain a suitable voltage for all channels. The resistor 57 serves to bleed current from the anode supply. This resistor 57 has the same adjustment or value in all channels. Condensers 54 and 59 are by-pass condensers which by-pass the alternating current component of anode current at the input frequency. Resistor 49 is a series grid resistor which, as mentioned before, serves to limit the grid voltage to zero regardless of the applied voltage.

Although the channel selector 18 of the invention has been shown as having a resistor 57 shunting the by-pass condenser 59, it should be understood that, if desired, the resistor 57 can be omitted, although this is not a preferred arrangement. To achieve the same results with the resistor 57 omitted, the value of B would have to be suitably selected in order to obtain a desired voltage for all channels which would result in constant amplitude of voltage pulses from the channel selectors. The use of resistor 57, however, eliminates the necessity for varying the value of B to obtain the desired voltage.

The output from each channel selector is in the form of a rectangular wave pulse which is caused by the drop in anode voltage in the vacuum tube 60. This rectangular wave output pulse is applied to the saw-tooth generator 20 and is differentiated by condenser 61 and resistor 62. The result of this differentiation by condenser 61 and resistor 62 is a sharp negative input which is applied to the grid of vacuum tube 91. Tube 91 is normally conducting. The sharp negative impulse applied to its grid from the differentiator 61, 62 is of sufficient magnitude to bias the tube 91 to cut-off and beyond for the duration of the negative impulse. The duration of this negative impulse is determined by the values of resistor 62 and condenser 61 and the amplitude of the rectangular pulse from tube 60. Since the amplitude of this rectangular pulse is constant in accordance with the invention, the duration of this negative impulse is determined solely by the values of resistor 62 and condenser 61.

During the time tube 91 is normally conducting, the voltage on its anode is low. The application of the negative impulse to the grid of tube 91 cuts off the flow of current in tube 91 and causes the anode voltage on this tube to rise, as a result of which condenser 63 starts to charge through resistor 64. When tube 91 again conducts at the end of the applied negative pulse, condenser 63 discharges through the low impedance path of tube 91 to its normal voltage. The result is a short saw-tooth wave obtainable from condenser 63 of a duration equal to the duration of the negative impulse applied to the grid of tube 91. In practice, this saw-tooth wave may be 10 mu sec. long, which is roughly of the order of a one channel interval, or the length of one tread of the step wave voltage (curve 102 of Fig. 3).

Curve 105 of Fig. 3 illustrates the wave form of the differentiated pulse in channel #4 which is applied to the grid of tube 91. The interval $t2$ represents the non-conducting time duration of tube 91, corresponding to the modulation range of channel #4.

The horizontal dash line in curve 105 represents the cut-off grid voltage of the tube 91. The maximum negative value of the differentiated pulse is about −30 volts.

The saw-tooth wave produced by saw-tooth generator 20 in the output of tube 91 is applied to the pulse generator 22 and is stepped up or increased (from a direct current standpoint only) from an original +35 volts base line to about +50 volts base line at point 65. The saw-tooth wave amplitude at point 65 is about 40 volts. Curve 106 in Fig. 3 illustrates the voltage wave form of the saw-tooth wave applied to the pulse generator 22 at point 65.

The pulse generator 22, whose grid is coupled to the output of the saw-tooth generator 20, is normally non-conducting and is so biased as to start to conduct at about the middle of the applied saw-tooth wave in the absence of modulation. Coil 66, in the output of pulse generator vacuum tube 22, has voltages of relatively opposite polarity on its end terminals when a rapid current change occurs in it. This coil is a differentiating coil with distributed capacity. Damping resistors 67 are provided for both halves of the coil 66 so as to limit the oscillations in the coil 66 to a single half period for each separate change of current.

Curve 107 in Fig. 3 illustrates the wave form of the anode current in a pulse generator 22 of channel #4 for the unmodulated condition. It should be noted that the pulses in curve 107 commence at about the middle of the applied saw-tooth wave of curve 106. Curve 108 in Fig. 3 represents voltage pulses in the output of the pulse generator 22 at point 68, due to the presence of current pulses of curve 107.

Modulation is applied to the vacuum tube of pulse generator 22 by modulator tube 26 which serves to vary the bias on tube 22 and hence to vary the critical value or time at which the pulse generator 22 starts to conduct, over the range of the applied saw-tooth.

Vacuum tube 69 is a cathode follower, as a result of which any variation in its grid voltage produces an equal voltage variation on its cathode. Resistor 70 carries the cathode currents of tubes 22, 26 and 69. Resistor 70 is a common cathode resistor for both vacuum tubes 26 and 69. A variation in current through tube 69 in response to modulation or rectified ringing causes a variation in the cathode voltage of tube 69. The grid voltage of tube 26 is fixed and hence the variation in cathode voltage of tube 69 changes the average anode response of the modulator 26 and hence the cathode bias of the pulse generator 22. Any appreciable flow of current through tube 22 must be through the modulator 26. A very large resistor 71 connected between ground and the cathode of pulse generator 22 (for example 2 megohms) is provided to prevent the omission of a pulse through the vacuum tube 22, in the event the modulator tube 26 is cut off by excessive modulation.

A failure to pass a pulse over each channel at all times for each assigned period may result in cross-modulation or cross-talk in the channels due to a change in power levels throughout the system. Each pulse draws about two amperes of current in the radio frequency transmitter and hence the failure of a pulse will change the average current in the various circuits in the transmitter and tend to produce cross-modulation or interaction of the channels. The use of resistor 71 prevents the drop out of a pulse in the event of the foregoing circuit conditions and assures the passage of a pulse from the pulse generator for each channel at all times during the assigned periods.

Only the front edge of the positive pulse passed by pulse generator 22 is ultimately used, and this front edge varies in time over the selected range in accordance with the modulation.

The dotted line pulses in curve 108 on opposite sides of the solid line pulses of positive polarity represents the extreme position during modulation. This extreme position is shown as covering a range $t3$, which is about $\pm 4\ \mu$ sec. on each side of the solid line pulse, or $8\ \mu$ sec. total.

The maximum advanced position in time due to negative modulated voltage is determined by the minimum anode resistance of modulator tube 26 (corresponding to maximum conduction position), which occurs when tube 69 is cut off, and the actual value of this minimum anode response is set up by the values of resistors 70 and 72. When a maximum positive modulating voltage is applied to tube 69, its current will cut-off tube 26 and leave resistor 71 as the biasing resistor for tube 22 of the pulse generator. Thus, the flow of current through resistor 71 when tube 26 is cut off automatically biases the pulse generator 22 so that it yields a useful pulse at the top position of any saw-tooth wave applied to the grid of tube 22.

Resistor 62 in the saw-tooth generator 20 may be called the modulation limit control because it varies the duration of the negative pulse in line 105 (Fig. 3) and hence the time during which tube 91 of the saw-tooth generator is cut-off. For this reason, resistor 62 is shown as being variable.

Speech and ringing are applied to leads 73. Ringing is furnished by a twenty cycle low frequency audible source (not shown). The condenser 74 in the input circuit is a low reactance for the higher speech frequencies and is a relatively large reactance for the low ringing frequency. During speech, the modulation is applied to the grid of tube 69 via transformer T3 and lead 75. When ringing is applied, there is developed a voltage across condenser 74 which is applied to lead 76 to be rectified by tube 77, to thereby develop a direct current voltage across the resistor 78, such that a negative polarity appears on that terminal of resistor 78 which is connected to the grid of tube 69. Tube 69 is cut off by this voltage of negative polarity resulting from ringing, and will allow modulator tube 26 to assume its minimum anode resistance for the flow of current through tubes 22 and 26. The final result of this is that the pulse developed by the pulse generator 22 occurs at a time corresponding to a position nearest the beginning of a saw-tooth wave, hence advancing the timing of the direct current pulse in the output of the pulse generator 22 to its extreme position. This advanced pulse will remain in this position for as long as the ringing 20 cycle current is applied to the particular channel.

The clipper-limiter 24 eliminates variation of the amplitude of the modulated pulse (note line 10, Fig. 3) which appear at point 68 and also discards or refuses to pass the negative unmodulated pulse of line 108, Fig. 3. This limiter prevents the passage of low amplitude pulses which would contribute to cross modulation.

The output from the clipper-limiter 24 is represented by line 109, Fig. 3, which indicates the anode current of the clipper-limiter 24 of channel #4. The dotted pulses in line 109 indicate the time variations in the pulse in this channel in response to modulation. Obviously, there will be pulses like 109 for every channel at different positions along the time base, and these pulses in the different channels do not overlap.

All output pulses from the individual channels 1 to 8, inclusive, are applied to lead 31, which connects with the common differentiator and limiter circuit 32. Lead 31 is connected to a differentiator coil 79 which produces small duration pulses of positive and negative polarities from the channel pulses on lead 31 as illustrated in line 110. The positive portions of these pulses appearing in line 110 of Fig. 3 occur at the front edges of the applied pulses represented by line 109 in Fig. 3. These differentiated pulses from coil 79 (Fig. 3, line 110) are applied to a top and bottom normally non-conducting clipper-limiter tube 80. The resulting pulses of current in the output of tube 80 are fed into another differentiator coil 79′, and the output from this coil 79′ fed to another top and bottom normally non-conducting clipper-limiter tube 80′ of circuit 34. Coils 79 and 79′ and tubes 80 and 80′, respectively, function in a similar manner. The differentiated pulses from coil 79′ which are impressed on the grid of the clipper-limiter tube 80′ are shown in line 111 of Fig. 3.

The discharge pulse which is taken off the counter 14 and applied to lead 15 is shown in line 112 of Fig. 3. The positive section of the discharge pulse initiates the discharge of the step wave (Fig. 3 line 102) via tube E of counter circuit. The length of this discharge pulse is made adjustable by means of the RC constants of the circuit elements associated with tube B in the counter circuit. This discharge pulse is applied via lead 15 to the grid of vacuum tube 81 through differentiating condenser P.

The operation of the synchronizing pulse generator is as follows: On the negative going portion of the discharge pulse (line 112 of Fig. 3) tube 81 is cut off and remains cut off for a period of time determined by the time constants of condenser P and resistor P′. (In the actual circuit tried out in practice this time was made 2 $\mu$ sec.) During the time when tube 81 is cut off a positive pulse is developed at point 82. It will now be seen that the occurrence time of the pulse at 82 is a function of the length of the discharge pulse of line 112, Fig. 3, and the length of the pulse at 82 is a function of the time constants of P and P′. The pulse at 82 is then the synchronizing pulse and is coupled to the output transformer T4 via coupling tube 83. Coupling tube 83 is also a top and bottom limiter.

The positive going edge of the discharge pulse (line 112) has no effect on tube 82 since on the positive going edge P is charged up via grid of tube 81 and hence discharged on the negative or falling edge of the discharge pulse.

The generated pulse at point 82 is applied to the grid of coupling tube 83, which is normally non-conducting due to the grid leak bias provided by resistor 85 and condenser 84. This positive pulse on the anode of tube 81 causes tube 83 to conduct and produce a pulse of current of the same shape as the voltage pulse applied to tube 83. Tube 83, it should be noted, draws its current through one winding of the transformer T4, which is common to both tubes 80′ and 83. These common currents in tubes 80′ and 83 give rise to a pulse of voltage in the output of transformer T4 at point 86 whose appearance is represented in line 114 of Fig. 3. Line 114, Fig. 3, illustrates the appearance of all the channel and synchronizing pulses which occur in the output of transformer T4. It will be seen that this synchronization pulse produced by the synchronizing pulse generator is of longer duration than the individual channel pulses and periodically occurs after every eighth channel pulse. Vacuum tubes 80 and 80′ of the differentiators and limiters 32, 34 are both normally non-conducting. Tube 80′ draws current each time a channel pulse is to be passed and coupling tube 83 draws current only when the synchronization pulse is to be passed. When tube 83 draws current, tube 80′ is not conducting at this particular time. A comparison of the pulses in lines 111 and 114 of Fig. 3 will show that in line 111 there is a blank space for the synchronization pulse which is later filled in in line 114.

The output from transformer T4 is passed over a transmission line 87 to a power amplifier 36 comprising three cascaded vacuum tube amplifier stages. The output of the power amplifier 36 at point 88 is shown in line 115, Fig. 3, and is applied to the cathode of a magnetron oscillator 40 whose anode is grounded. The pulses at point 88 are direct current pulses of negative polarity having a time duration of .6 $\mu$ sec. for the signal pulses and 2.2 $\mu$ sec. for the synchronizing pulses. These direct current pulses are applied to the cathode of the magnetron and cause the magnetron to produce radio frequency pulses of a duration somewhat less than the duration of the pulses applied to the magnetron. The output from the magnetron is applied to a suitable antenna circuit via a concentric transmission line 89.

There is shown a suitable regulator circuit for stabilizing pulse amplitude applied to the magnetron and also a line coupling circuit in the output of the magnetron for correctly loading the magnetron for maximum power output.

The radio frequency pulses from the magnetron, which are applied to the line 89 and hence to the antenna, may have a frequency of the order of 1000 megacycles or higher, and the duration of these pulses are somewhat shorter than the triggering or firing pulses applied thereto and occurring at point 88. The reason that the radio frequency pulses from the magnetron are of shorter duration than the direct current pulses applied thereto by the power amplifier is that the magnetron does not oscillate until the crests of the applied pulses are almost reached. The radio frequency pulses may have a duration of about .4 $\mu$ sec. for the signal pulses and 2.0 $\mu$ sec. for the synchronizing pulses.

The following description relates to the receiver and associated circuits.

The pulses which the receiving system of Fig. 4 is designed to receive are short spaced pulses of radio frequency energy which are transmitted from the remote multiplex transmitter of Figs. 1, 2 and 2*a*. These ultra short wave pulses may be in the form illustrated in curve A of Fig. 5*a* which shows eight channel pulses of short duration and one synchronizing pulse of longer duration for each frame or cycle. The showing of curve A, Fig. 5*a* is for the condition of no modulation and is given by way of example only. It should be noted that the pulses are evenly spaced from each other.

The pulses of curve A, Fig. 5*a*, are collected by antenna 19 and impressed upon superheterodyne receiver 20, Fig. 4, the output of which is in the form of video pulses which may take the form shown in curve B of Fig. 5*a*. These video pulses are impressed via lead 107 upon a common unit shown as a box in dash lines, and also via lead 101, to the different channel units of which there are eight, in the assumption that the system describes an eight channel multiplex system.

The video pulses which are impressed upon the common unit are first applied to a synchronizing pulse separator circuit 1, 2 wherein only the synchronizing pulse is effective to produce a pulse which is applied to a pulse generator circuit 3, 4, 5. This synchronizing pulse separator circuit 1, 2 suppresses the channel pulses because of the fact that the channel pulses are of shorter duration than the synchronizing pulse. In effect, the synchronizing pulse separator circuit comprises a pair of vacuum tubes 1, 2 of which vacuum tube 1 serves as a limiter.

The pulse generator 3, 4, 5 comprises three vacuum tubes whose functions will appear in more detail later on in connection with the description of Fig. 6*a*. This pulse generator in effect, is a discharge pulse generator which produces a discharge pulse which is sent over two paths, one of which extends to the phasing trigger circuit 6, 7 and the other of which extends via lead 100 to a step wave generator 11, 12.

The phasing trigger comprises two vacuum tubes 6, 7 which provide a pulse of adjustable phase for driving a 90 kc. exciter vacuum tube 8. This tube has as its output, a circuit 8' which is tuned to 90 kilocycles. The output of the 90 kc. exciter, as derived from the tuned circuit therein, is in the form of a 90 kc. sine wave, which is fed to a 90 kc. limiter 9, 10. This limiter comprises a pair of vacuum tubes 9, 10 which serve to convert the applied 90 kc. sine wave to peaked positive pulses, in turn, applied via lead 105 to the step wave generator 11, 12.

The step wave generator comprises several vacuum tubes which function to produce a step wave voltage having a plurality of steps or risers corresponding in number to the number of channels of the system. The discharge pulse applied from the discharge pulse generator 3, 4, 5 via lead 100 to the step wave generator serves to terminate the step wave voltage after a desired number of risers or steps.

The output from the step wave generator is passed through a coupling vacuum tube 13 and then via lead 102 to the various channel selectors 21, 21', 21'' of the different channel units, it being understood that there are as many channel units as there are channels in the system; in this case eight channels.

The channel selectors in the different channels are differently biased so as to become conductive on different risers or steps of the applied step wave voltage. The output of each channel selector is applied to a trigger circuit 23, 24 which is in turn associated with a gate 22, they later obtaining the signal or video pulses from lead 101. The arrangement of the channel selector trigger circuit and gate are such as to convert the applied signal video pulses whose times of occurrence vary in accordance with the signal modulation to variable width pulses whose duration or width correspond to the signal modulation.

The variable width pulses from the output of the trigger circuit 23, 24 are supplied to a low pass filter 34 which removes all high frequency components and passes the audio signal to the audio amplifier tube 27.

A ringing circuit 25, 26 is also provided for calling the attention of the attendant when it is desired to apply ringing currents to a particular channel.

From the foregoing, it will be seen that the receiving system has amplified the weak radio frequency pulses, converted them to D. C. pulses (video) and then supplied these pulses to the receiving multiplex at a suitable amplifier level. The receiving multiplex system regenerates the synchronizing period (100 microseconds) directly from the incoming signal, and with it separates the channel pulses in the same order that they were originally generated. The separated pulses are then demodulated to give eight voice frequency outputs.

A description will now be given of Figs. 6*a* and 6*b* which illustrate the circuit details of the system of the invention.

The synchronizing separator comprises a triode tube 1 normally biased to cut off and also tube 2 which is coupled to the output of triode 1 through a differentiator circuit. Tube 1 acts as a limiter. The video pulses (curve B) from the radio receiver are applied to the grid of triode 1. Tube 1 is biased to be normally non-conducting and conducts only during the presence of a pulse, or, putting it in other words, it conducts only during the time of the individual pulses, whether channel or synchronizing pulses. Tube 1 acts as a limiter and its output comprises spaced pulses whose polarity are reversed relative to the input pulses. These reversed polarity pulses in the output of tube 1 are differentiated and applied to the grid of tube 2. (Note curve C.) Tube 2 is also normally non-conducting, and is so biased that only the peaked positive-going impulse produced from the trailing edge of the synchronizing pulse will cause it to conduct. This is because the peaked impulses produced from the synchronizing pulses are of larger amplitude than the peaked impulses produced from the channel pulses, due to the fact that the synchronizing pulse is of longer duration than the channel pulses.

The discharge pulse generator comprises tubes 3, 4 and 5. The output from the synchronizing separator, taken from the cathode of tube 2, is a peaked pulse in the positive direction which gradually diminishes over about 33 microseconds, and this gradual diminution of the pulse is caused by the discharge time of the capacity to ground through the high cathode resistor 40 of tube 2 and the grid of the following tube 3 in the discharge pulse generator. (Note curve D.)

Tube 3 is normally non-conducting and the application of the positive pulse thereto from the synchronizing separator causes it to conduct, as a result of which a negative pulse of sloping trailing edge is produced on its anode (curve E) which causes a negative pulse (curve F) to be supplied to the grid of tube 4. Tube 4, however, is normally conducting and the application of a negative pulse thereto causes it to cease conducting for a short period of time, thus producing a positive output pulse in its anode circuit of about 3 microseconds which looks like curve G. Tube 5 is a coupling tube and is normally non-conducting. The application of a positive pulse to its grid from the anode of tube 4 produces a discharge pulse on its cathode of positive polarity which looks like curve H.

The discharge pulse from the discharge pulse generator is supplied both to the phasing trigger and to the step wave generator. The phasing trigger is a self-restoring trigger circuit having one degree of electrical stability and comprises tubes 6 and 7. In effect, this phasing trigger is nothing more or less than a delay circuit for delaying the pulses passed thereto by a predetermined amount. Normally, tube 6 is non-conductive and tube 7 conductive. When this trigger circuit is fired, it remains in its active state for a time determined by the time constant of the circuit. The amount of delay is adjusted by means of a tap on the anode resistor of tube 7. The positive pulse from the cathode of tube 5 of the pulse generator is applied to the grid of tube 6 of the phasing trigger and fires the trigger circuit to its active state. Output from the phasing trigger is taken from the common cathode circuit and is primarily a negative pulse whose trailing edge has an overshoot or positive peak, so to speak, which is utilized to excite the 90 kilocycle exciter 9 (note curve J).

The 90 kilocycle exciter comprises a vacuum tube 8 having in its anode a parallel tuned circuit 8' whose resonant frequency is 90 kilocycles. This tuned circuit is loosely coupled to the anode of the exciter tube. The exciter tube 8 has a self-bias which adjusts itself so that it passes current only on the overshoot or peaks of the waves supplied to it by the phasing trigger. Note curve J. This overshoot occurs once each frame; or, putting it in other words, once for each synchronizing pulse but not necessarily at the synchronizing pulse time. When the exciter tube passes current, it supplies a driving pulse or kick (curve K) to the 90 kilocycle tuned circuit 8'. This driving pulse or kick sets the tuned circuit into oscillations at a 90 kilocycle rate. These oscillations are of sine wave form and tend to decay slightly. In this particular case, the driving pulses from the 90 kilocycle exciter occur at intervals of 100 microseconds corresponding to a rate of 10,000 per second. Thus, one driving pulse is supplied to the tuned circuit for every nine cycles of sine wave oscillation generated in the tuned circuit. This is shown in curve L.

The portion X of the curve J is adjustable by adjustment of the resistor 18 of the phasing trigger.

The output of the tuned circuit 8' is passed to the grid of vacuum tube 9 of the 90 kilocycle limiter. This tube passes only the positive halves of the sine wave cycles (curve L) generated by the tuned circuit, as shown in curve M, and passes these positive halves on to the cathode of vacuum tube 10 of the 90 kilocycle limiter. It should be noted that one pulse in each nine pulses passed by tube 9 to tube 10 is of larger amplitude than the others in each frame. This larger pulse immediately follows the driving pulse from the 90 kilocycle exciter; and the decaying amplitude of the pulse of curve M is caused by the inherent damping of the 90 kilocycle tuned circuit 8'. Thus, this 90 kilocycle tuned circuit 8' is maintained in oscillation by its exciting pulse.

Tube 10 of the 90 kilocycle limiter converts the pulses of waveform M to more peaked pulses of wave form N. The negative going pulse of curve N is caused by the reaction from the step wave generator which is coupled to the output of tube 10 of the 90 kilocycle limiter.

Output from the 90 kc. limiter is taken from the anode circuit of tube 10 via lead 105 and this output of curve N is passed onto the grid of vacuum tube 12 of the step wave generator as a series of recurring positive pulses. The step wave generator is of the form described in copending application Serial No. 629,169 filed November 16, 1945, now U. S. Patent 2,474,040, granted June 2, 1949, wherein the legend "positive input pulse" in the drawing thereof, corresponds to the pulses passed by the 90 kilocycle limiter 9, 10 to the step wave generator. The legend "synchronizing pulses" in U. S. Patent 2,474,040 corresponds to the discharge pulse passed to the step wave generator directly from the cathode of tube 5 of the pulse generator over lead 100.

The coupling vacuum tube 13 corresponds to the cathode follower tube G of U. S. Patent 2,474,040. Step wave output is taken from the cathode of this coupling tube and supplied via lead 102 to the channel selector circuits 21, 21', 21'' etc., of the different channel units shown in Fig. 4. This step wave output supplied to the channel units is curve P. The channel units also have supplied thereto the video pulses from the radio receiver over lead 101.

In the step wave generator, the anodes of vacuum tubes 11, 12 and 13 are connected to a common source of anode polarizing potential +290 volts. Triode tube 12 is biased by the resistor-condenser combination 41 in its cathode circuit so as to be normally non-conducting. The grid of triode 12 is connected through a resistor 42 and a coupling condenser 43 to lead 105 which supplies D. C. input pulses of positive polarity (curve N) from the output of tube 10 of the 90 c. c. limiter. Each of these input pulses (Curve N) is of sufficient magnitude to overcome the cut-off bias of tube 12 and cause it to conduct for the duration of the applied pulse.

A storage or step condenser 44 is connected between ground and the circuit combination 41, as a result of which an incremental charge of voltage is built up on this condenser whenever tube 12 conducts. A step wave voltage is built up across condenser 44, and this step wave voltage has a plurality of steps of increasing amplitude corresponding in number to a desired number of input pulses (curve P).

Tube 11 is a normally non-conductive vacuum tube which, when it conducts, serves to restore coupling condenser 43 to its original condition after each input pulse. The cathode of tube 11 is connected to the grid of tube 12, while the grid of tube 11 is connected via lead 46 to the circuit combination 41.

Tubes *a*, *b* and *c* are normally non-conductive and become conductive simultaneously. The grids of these tubes are connected together and their cathodes are also connected together and to ground. The space path of tube *c* is effectively across step condenser 44, and when this tube conducts, it forms a low impedance discharge path across condenser 44. Tube *b*, when it conducts, insures the quick discharge of the load capacity connected to the cathode of tube 13. Tube *a* serves to prevent tube 12 from conducting during the discharge of step condenser 44.

In Fig. 4, the channel selectors 21, 21', 21'' are differently self-biased, and each channel selector is normally biased well beyond the current cut-off condition.

The channel selector is substantially like that shown in the transmitter, Fig. 2 except for the fact that in the anode circuit, a coil 30 is used instead of a resistor. This coil 30, Fig. 6*b* is a differentiating coil and its purpose is to provide a much shorter pulse than that provided by the output of the channel selector described in the Houghton copending application. The channel selectors are differently biased to operate on successive risers of the step wave output (curve P) from the step wave generator 11, 12. Each step or rise in the step wave voltage appearing in lead 102 is great enough to insure that during its occurrence the current of the corresponding biased channel selector shall be driven rapidly from beyond the current cut-off condition to a zero bias value. Once a channel selector, which is normally cut-off, passes current, (it responds to the increase in voltage on the particular step rise), it will continue to pass current for the completion of the step wave voltage. The differentiated short pulse output from the channel selector 21 is in the negative direction, as shown in curve Q, for example, (corresponding to channel 4) and is passed on to a self-restoring trigger circuit comprising vacuum tubes 23 and 24.

Tube 23 of the trigger circuit is normally conducting while tube 24 is non-conducting. The trigger circuit has one degree of electrical stability and has a stable state and an active state. Its time constant is such that it would normally restore to normal (the stable state) if left alone after it has been fired to the active state, restoring itself after a time interval considerably longer than the time allotted for one channel.

However, the trigger circuit is made to restore itself to normal by the video signal pulse supplied to a gate 22 at a time interval after being fired which is considerably shorter than the time allotted for one channel. Putting it in other words, the channel selector 21 fires the trigger circuit to its active state, while the gate 22 turns off or restores the trigger circuit to its stable state. The output from the trigger circuit is thus a pulse of variable width, depending upon the time interval between the channel selector output pulse and the incoming video signal pulse for that channel. Thus, it will be seen that the channel selector 21, the gate 22 and the trigger circuit 23, 24 are in effect a system for transforming the time-displaced video signal pulses to variable width pulses, the variation in width corresponding to the signal modulation at the remote transmitter which varies the timing of the transmitted pulses. It should be understood, of course, that I am now considering the pulses for a single channel, inasmuch as the different channel units have similar equipment for effecting the same results for their own respective channel pulses.

The video pulses from the output of the radio receiver are applied over lead 101 to the grid of the gate 22. Gate vacuum tube 22 is normally non-conductive. These video pulses are of positive polarity and are not of themselves of sufficient amplitude to make the gate 22 conduct. However, when the trigger circuit 23, 24 is fired and is in its active state, there is supplied to the grid of the gate 22 over lead 31 a positive voltage pulse from the common cathode circuit of the trigger circuit. This positive voltage pulse from the trigger circuit applied to the grid is of sufficient magnitude to reduce the cut-off bias on the tube 22 to an extent such that if at this time a video signal pulse of positive polarity is also applied to the grid via lead 101, the resulting voltage from both the video signal pulse and the trigger pulse are sufficient to overcome the bias on the gate 22 and cause it to conduct. It will thus be seen that only in the simultaneous presence of both the video signal pulses and a positive pulse from the trigger circuit will the gate 22 of any one channel pass current. When the gate 22 passes current, the voltage on its anode will drop and cause the effective application via lead 32 of a negative pulse to the anode of tube 23 of the trigger circuit of a magnitude sufficient to restore the trigger circuit to normal. Output from the trigger circuit in the form of a variable width pulse is taken from the anode of tube 24 via lead 33 and passed onto a low pass filter 34. This low pass filter removes all high frequency components and passes the audio signal to the audio amplifier tube 27.

Curve R illustrates the voltage wave form appearing on the grid of gate 22. The short sharp pulses correspond to the signal pulses and these short sharp pulses are not sufficient of themselves to overcome the cut-off bias of the gate. The large, longer duration pulse corresponds to the voltage occurring on the grid of 22 due to the simultaneous application of both a video signal pulse and a positive pulse from the trigger circuit, and the peak of this larger amplitude longer duration pulse has a magnitude sufficient to overcome the cut-off bias on the gate 22.

Curve S shows the voltage variation at the common cathode of the trigger circuit 23, 24. The fixed edge is determined by the firing pulse for the trigger circuit 23, 24 supplied from the channel selector, while the trailing or modulated edge is determined by the restoring pulse supplied by the gate 22.

Pulse rectifier tube 25 and rectifier tube 26 comprise the ringing system. The rectifier 25 has an input pulse supplied to its grid from the anode of tube 23 of the trigger circuit through a low pass filter comprising a high resistance 35 and a capacity formed by the grid-to-ground capacity of tube 25. The pulses from the trigger circuit, after passing through the low pass filter, appear on the grid of tube 25 in the form shown in curve T.

In the absence of signal modulation for this particular channel, the wave form at the grid of tube 25 has the form of the solid line of curve T. Pulse rectifier tube 25 is supplied with a floating fixed bias from the rectifier 26. This bias is adjusted to a value such that the pulse of the solid line of curve T causes conduction near the peak of this pulse. This conduction current flows through resistance 36 in the cathode of tube 25 to a source of negative bias —10 volts. The conduction current through resistor 36 is sufficient to maintain the cathode of tube 25 at a potential in the neighborhood of +5 volts with respect to ground.

This bias is supplied to the grid of audio amplifier tube 27 through a low pass filter comprising resistances 37, 38 and capacitor 39. This condition causes audio amplifier tube 27 to conduct in normal fashion as an audio amplifier.

In the presence of modulation, the pulses applied to the grid of tube 25 are shown in their extreme modulated positions by the dotted lines of curves T. It should be kept in mind that the positive going pulse appearing at the anode of trigger tube 23 has a variable width corresponding with the channel modulation. This variable width pulse undergoes a wave form distortion upon passing the low pass filter between the anode of tube 23 and the grid of tube 25. This distortion is such that a wide pulse is passed with a small amplitude, as shown in curve T. It will be observed that tube 25 conducts only on pulses greater than a certain amplitude near the peak value of the pulses shown in curve T and hence conducts during these pulses with or without the presence of modulation; thus, audio amplifier tube 27 remains in its conducting condition.

As described hereinabove in connection with the transmitter, the ringing is accomplished by advancing a channel pulse to its extreme position, where it remains for the duration of a ring. This ringing condition produces a narrow pulse at the anode of trigger tube 23 and this pulse, after passing the low pass filter to the grid of tube 25, is of such low amplitude that it cannot overcome the fixed bias on tube 25; hence tube 25 remains completely non-conducting. Under this condition, the voltage at the cathode to tube 25 is maintained at a value close to minus 10 volts with respect to ground. This condition provides this same negative bias at the grid of audio amplifier tube 27 causing it to be essentially at cut-off. In the plate circuit of tube 27 is connected, along with the audio output transformer, a ringing relay which is kept closed by the normal plate current of this tube. When this tube is cut off, the ringing relay opens and causes a twenty cycle ringing channel generator to be started and switched on to the outgoing line.

What is claimed is:

1. A multiplex communication system of the type wherein a plurality of channels are coupled to a common transmission medium during different sequentially-assigned time intervals, including a channel selector for each of said channels, a generator to produce a recurring step-wave voltage having a plurality of steps of different voltage values, all of said channel selectors being connected in parallel to said generator to receive said recurring step-wave voltage, the bias on said channel selectors being different to render said selectors effective at different steps of the received step-wave voltage, each channel selector having a pulse generator coupled thereto for control thereby, an output circuit common to said channels, differentiating and clipping circuitry interposed in said common output circuit to shorten the effective lengths of the pulses therein, a synchronizing pulse generator coupled to said recurring step-wave voltage generator and responsive to the recurrence of the step-wave to produce a synchronizing pulse, and a circuit common to said pulse generator and said channels to combine the synchronizing pulse with the output from said channels.

2. In a multiplex communication system wherein different channels are coupled to a common transmission medium during different sequentially-assigned time intervals, each of said channels having a channel selector, a recurring step-wave voltage generator coupled in parallel to the input circuits of the different channel selectors to apply a recurring step-wave voltage having a plurality of steps of different voltage values thereto, said channel selectors being differently biased to become effective at different steps of the applied step-wave voltage, a pulse generator coupled to the channel selector of each channel for control by the channel selector thereof, an output circuit common to all of said channels, differentiating and clipping circuitry interposed in said common output circuit to shorten the effective lengths of the pulses produced therein, a synchronizing pulse generator coupled to said recurring step-wave voltage generator and responsive to the recurrence of the step-wave to produce a synchronizing pulse, and a circuit common to said synchronizing pulse generator and all of said channels to combine the synchronizing pulse with the pulses from said channels.

3. A multiplex communication system of the type wherein a plurality of different channels are sequentially connected to a common transmission medium, said channels each having signal input and signal output circuits, including a channel selector in each channel normally rendering said channel inoperative, each of said channel selectors being biased to render the associated channel operative at a predetermined bias different from that for all other of said channels, the output circuits of said channels being connected in common, a local wave generator arranged to produce a recurring step-wave having a plurality of steps of different voltage values, said local wave generator being connected to all of said channel selectors to apply said recurring step-wave voltages thereto to render said channels operative at different steps of said wave, a synchronizing pulse generator coupled to said local wave generator to derive a synchronizing pulse in response to the recurrence of said voltage step-wave, and circuit connections between said pulse generator and said common output circuit to combine the synchronizing pulse with the signal output of said channels.

4. In a multiplex communication system wherein a common transmission medium is sequentially assigned to different channels whereby the different channels are coupled to said transmission medium during different time intervals, said channels each having a channel selector; a step-wave voltage generator supplying the inputs of the different channel selectors in parallel with a recurring step-wave voltage having a plurality of steps of different voltage values, said step wave generator having means for discharging the step voltage wave when the amplitude of said wave reaches a predetermined value, said channel selectors being differently biased to become effective at different steps or risers of the applied step-wave voltage, a pulse generator in each channel under control of the channel selector therein, a common output circuit for all of said channels, a differentiator and clipper circuit in said common output circuit for shortening the effective lengths of the pulses therein, a synchronizing pulse generator coupled to said step-wave voltage generator and responsive to the discharge of the step wave for producing a synchronizing pulse, and a common amplifier for combining the synchronizing pulse with the pulses from said channels.

BERTRAM TREVOR.

REFERENCES CITED

The following references are of record in the file of this patent:

UNITED STATES PATENTS

| Number | Name | Date |
|---|---|---|
| 2,265,216 | Wolf | Dec. 9, 1941 |
| 2,277,192 | Wilson | Mar. 24, 1942 |
| 2,403,210 | Butement | July 2, 1946 |
| 2,405,239 | Seeley | Aug. 6, 1946 |
| 2,408,077 | Labin | Sept. 24, 1946 |
| 2,413,440 | Farrington | Dec. 31, 1946 |
| 2,419,546 | Grieg | Apr. 29, 1947 |